(12) United States Patent
Nakamura

(10) Patent No.: US 12,194,414 B2
(45) Date of Patent: Jan. 14, 2025

(54) LIQUID TREATMENT APPARATUS, PURE WATER PRODUCTION SYSTEM, AND LIQUID TREATMENT METHOD

(71) Applicant: Nomura Micro Science Co., Ltd., Kanagawa (JP)

(72) Inventor: Seiichi Nakamura, Atsugi (JP)

(73) Assignee: Nomura Micro Science Co., Ltd., Kanagawa (JP)

( * ) Notice: Subject to any disclaimer, the term of this patent is extended or adjusted under 35 U.S.C. 154(b) by 0 days.

(21) Appl. No.: 17/915,106

(22) PCT Filed: Sep. 3, 2021

(86) PCT No.: PCT/JP2021/032419
§ 371 (c)(1),
(2) Date: Sep. 28, 2022

(87) PCT Pub. No.: WO2022/080035
PCT Pub. Date: Apr. 21, 2022

(65) Prior Publication Data
US 2023/0117675 A1    Apr. 20, 2023

(30) Foreign Application Priority Data
Oct. 14, 2020    (JP) ................. 2020-173516

(51) Int. Cl.
*B01D 61/02*    (2006.01)
*B01D 61/08*    (2006.01)
(Continued)

(52) U.S. Cl.
CPC .......... *B01D 61/026* (2022.08); *B01D 61/08* (2013.01); *B01D 61/10* (2013.01); *C02F 1/441* (2013.01);
(Continued)

(58) Field of Classification Search
CPC ...... B01D 61/026; B01D 61/08; B01D 61/10; B01D 2313/243; B01D 2317/022;
(Continued)

(56) References Cited

U.S. PATENT DOCUMENTS 5,766,479 A * 6/1998 Collentro ................ C02F 1/441
210/651
6,187,200 B1   2/2001 Yamamura et al.
(Continued)

FOREIGN PATENT DOCUMENTS

CN    106458651    2/2017
JP    08-108048    4/1996
(Continued)

OTHER PUBLICATIONS

English machine translation of JP2000093751 provided from Search database. (Year: 2000).*
(Continued)

*Primary Examiner* — Terry K Cecil

(57) ABSTRACT

A desalination apparatus 12 (liquid treatment apparatus) includes a first water treatment unit 26 (liquid treatment unit) that includes a reverse osmosis membrane and in which a treated liquid is separated into a permeate that permeates the reverse osmosis membrane and a concentrate other than the permeate, a water recovery unit 28 (liquid recovery unit) that includes a reverse osmosis membrane and in which the concentrate is separated into a recovered liquid that permeates the reverse osmosis membrane and a waste liquid other than the recovered liquid, and a pressure increasing means that increases a liquid pressure of the concentrate, such that a state capable of separating into the recovered liquid and the waste liquid in the liquid recovery unit continues, and that directly feeds the concentrate from the liquid treatment unit to the liquid recovery unit.

2 Claims, 12 Drawing Sheets

(51) Int. Cl.
 *B01D 61/10* (2006.01)
 *C02F 1/44* (2023.01)
 *C02F 103/04* (2006.01)

(52) U.S. Cl.
 CPC .. *B01D 2313/243* (2013.01); *B01D 2317/022* (2013.01); *B01D 2317/025* (2013.01); *C02F 2103/04* (2013.01); *C02F 2301/066* (2013.01); *C02F 2301/08* (2013.01)

(58) Field of Classification Search
 CPC .............. B01D 2317/025; C02F 1/441; C02F 2103/04; C02F 2301/066; C02F 2301/08
 See application file for complete search history.

(56) References Cited

U.S. PATENT DOCUMENTS

| | | | |
|---|---|---|---|
| 2017/0173534 A1 | 6/2017 | Miyakawa et al. | |
| 2019/0224624 A1 | 7/2019 | Kitamura et al. | |
| 2019/0321786 A1* | 10/2019 | Nakamura | B01D 61/08 |
| 2019/0336914 A1 | 11/2019 | Miyakawa et al. | |
| 2022/0177340 A1 | 6/2022 | Nakamura | |

FOREIGN PATENT DOCUMENTS

| | | | |
|---|---|---|---|
| JP | 09-155344 | 6/1997 | |
| JP | 2000-051663 | 2/2000 | |
| JP | 2000093751 A * | 4/2000 | |
| JP | 2003-200160 | 7/2003 | |
| JP | 2010/201313 | 9/2010 | |
| JP | 2017-113652 | 6/2017 | |
| JP | 2017-124382 | 7/2017 | |
| JP | 2018-130679 | 8/2018 | |
| WO | WO 2014/007262 | 1/2014 | |
| WO | WO-2014007262 A1 * | 1/2014 | B01D 61/14 |
| WO | WO 2020/184044 | 9/2020 | |

OTHER PUBLICATIONS

English Translation of WO 2014007262 A1 downloaded from PE2E search database (2014).*
English translation of WO 2014007262 A1 (Year: 2014).*
International Search Report and the Written Opinion Dated Oct. 19, 2021 From the International Searching Authority Re. Application No. PCT/JP2021/032419 and Its Translation of Search Report Into English. (11 Pages).
Notice of Reasons for Refusal Dated Oct. 4, 2021 From the Japan Patent Office Re. Application No. 2020-173516 and Its Translation Into English. (7 Pages).
Notification of Office Action and Search Report Dated Feb. 10, 2023 From the State Intellectual Property Office of the People's Republic of China Re. Application No. 202180026266.1 and Its Translation of Office Action Into English. (12 Pages).

* cited by examiner

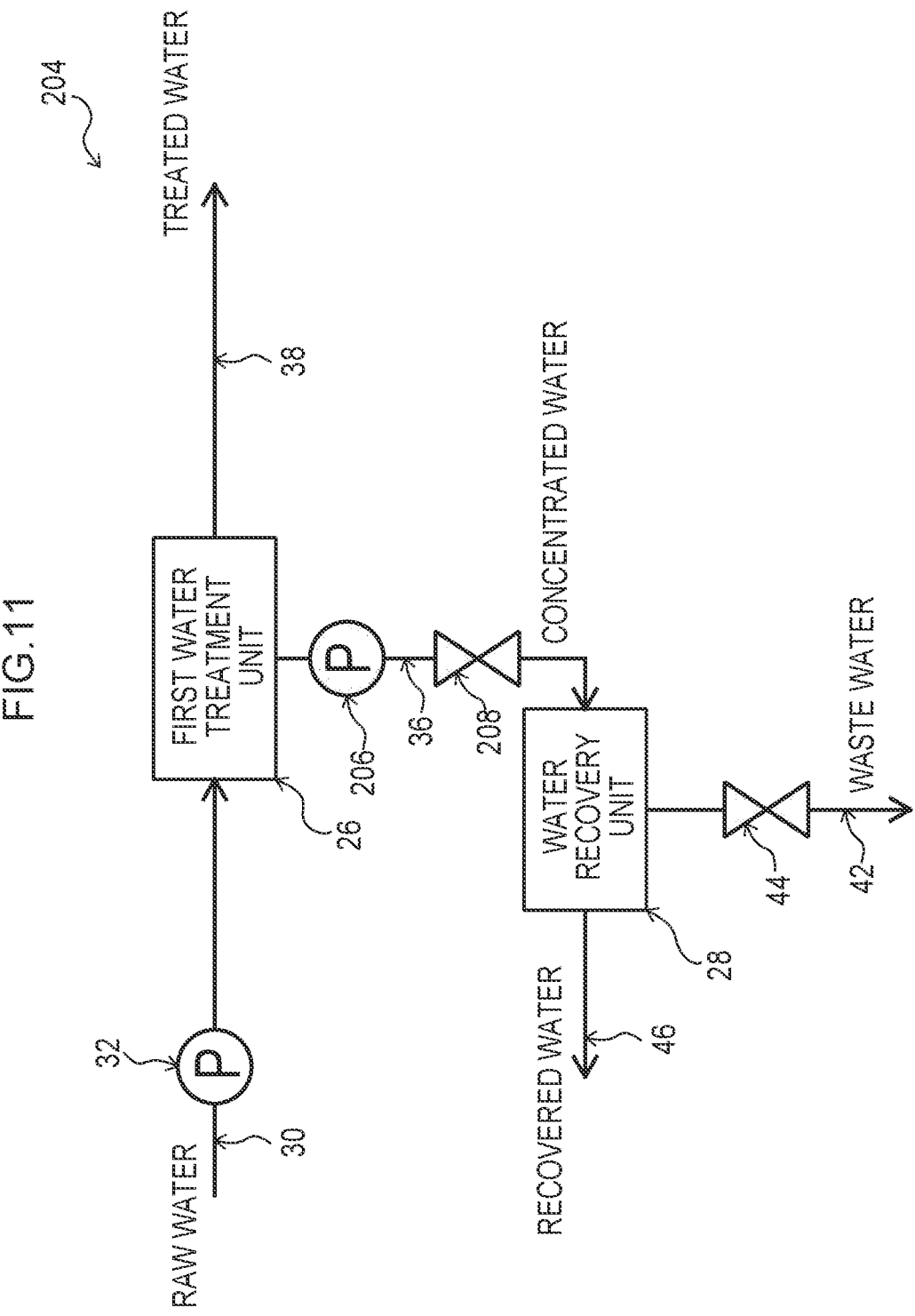

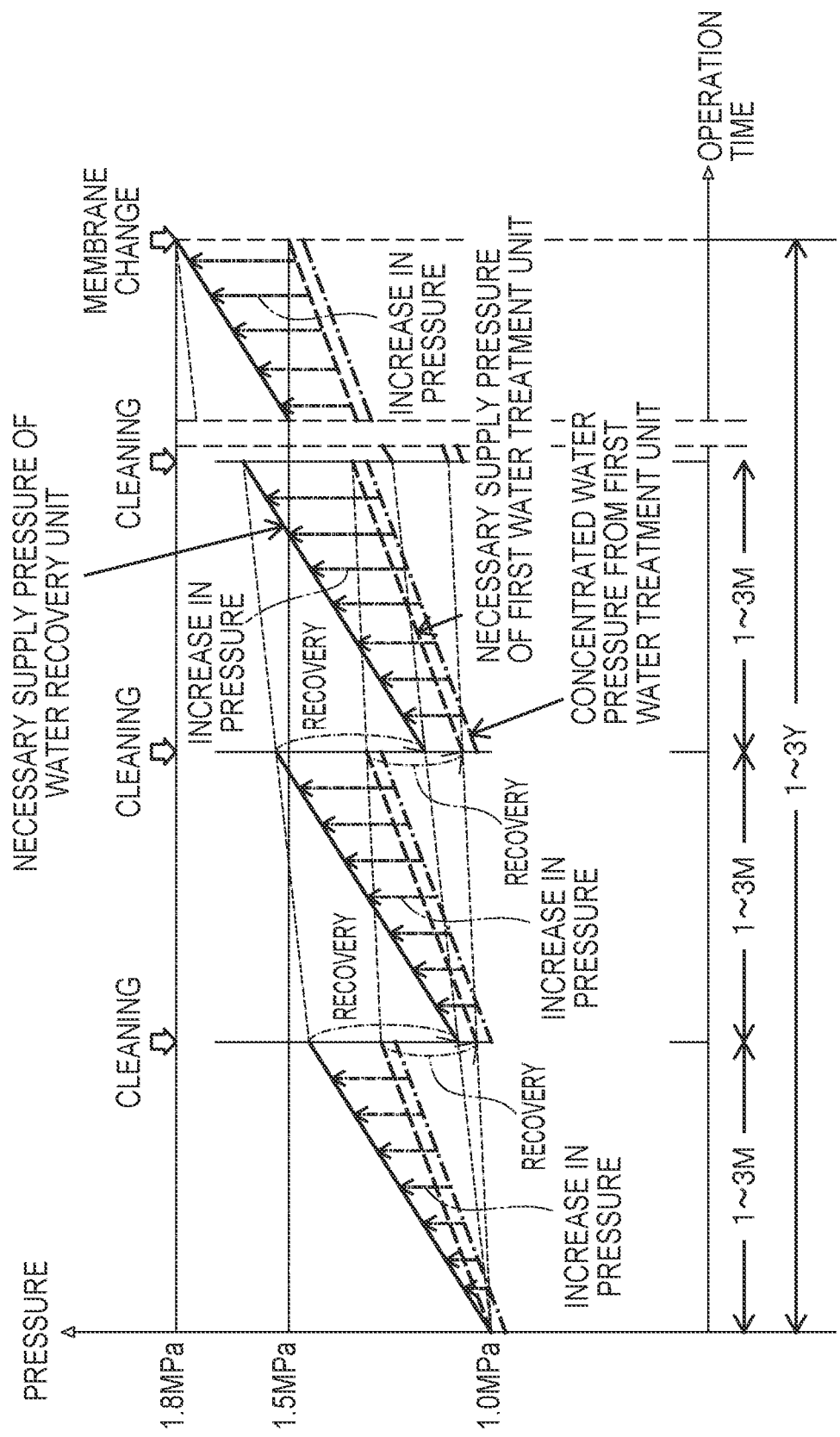

LIQUID TREATMENT APPARATUS, PURE WATER PRODUCTION SYSTEM, AND LIQUID TREATMENT METHOD

RELATED APPLICATIONS

This application is a National Phase of PCT Patent Application No. PCT/JP2021/032419 having International filing date of Sep. 3, 2021, which claims the benefit of priority of Japan Patent Application No. 2020-173516 filed on Oct. 14, 2020. The contents of the above applications are all incorporated by reference as if fully set forth herein in their entirety.

FIELD AND BACKGROUND OF THE INVENTION

The present disclosure relates to a liquid treatment apparatus, a pure water production system, and a liquid treatment method.

In recent years, in a pure water production apparatus for producing pure water (including an ultrapure water production apparatus for producing ultrapure water), fresh water such as city water, well water, or industrial water is often used as raw water. The fresh water is supplied to a liquid treatment apparatus including a reverse osmosis membrane (RO membrane), and is subjected to treatment of removing impurities such as fine particles/microorganisms, inorganic salts, ions, and organic substances in the supply water by the reverse osmosis membrane. In the liquid treatment apparatus including the reverse osmosis membrane, permeated water in which impurities have been removed and concentrated water other than the permeated water are generated.

In an actual liquid treatment apparatus, a plurality of modules each including a reverse osmosis membrane are often arranged in series in a flow direction of supply water. Thus, by passing treated water through the plurality of modules in order, a recovery rate of the treated water can be increased as compared with a case where the module is used singly. The "recovery rate" is a rate obtained by dividing an amount of generated permeated water by an amount of the treated water supplied. As a specific example, even when the recovery rate of a single module is about 10 to 20%, the recovery rate can be increased to about 75 to 90% by using the plurality of modules. However, if the recovery rate is higher than this range, a concentration of a scale component in the concentrated water may increase to such an extent that a scale actually occurs.

Here, for example, Japanese Patent Application Laid-Open (JP-A) No. 2010-201313 describes a reverse osmosis membrane separation method in which concentrated water of a first RO membrane separator is subjected to a membrane separation treatment by a second RO membrane separator. Specifically, a configuration in which a reducing agent is added to supply water of the second RO membrane separator so that an oxidation-reduction potential of water introduced into a second reverse osmosis membrane separator is 200 to 600 mV is described. JP-A No. 2010-201313 also describes that according to this configuration, the reducing agent is added in a suitable addition amount to the supply water of the second RO membrane separator, and a part of the reducing agent is subjected to a reduction treatment so that a required amount of a concentrated oxidizing agent remains in the concentrated water of the first RO membrane separator, thereby preventing membrane deterioration due to the oxidizing agent and preventing membrane contamination.

SUMMARY OF THE INVENTION

In the configuration described in JP-A No. 2010-201313, the permeated water generated by the second RO membrane separator is supplied as treated water to the first RO membrane separator, whereby the concentrated water generated by the first RO membrane separator can be reused. That is, the first RO membrane separator can function as a liquid treatment unit that separates the treated water into a permeate that has permeated a reverse osmosis membrane and a concentrate other than the permeate. The second RO membrane separator can function as a liquid recovery unit that separates the concentrate into a recycled liquid that has permeated the reverse osmosis membrane and a waste liquid other than the recycled liquid.

The concentrated water generated by the first RO membrane separator has high concentrations of a scale component and other impurities. That is, water having a high concentration of the scale component is sent to the second RO membrane separator. Therefore, in order to prevent the occurrence of scale, it is necessary to take measures against the scale such as injecting a scale inhibitor or the like.

Since the supply water to the second RO membrane separator is the concentrated water from the first RO membrane separator, the amount of the supply water to the second RO membrane separator is smaller than the amount of the supply water to the first RO membrane separator.

Since the concentrated water obtained by the first RO membrane separator is concentrated to the vicinity of the limit of scale occurrence, scale is significantly likely to occur in the second RO membrane separator as compared with the first RO membrane separator. Thus, the first RO membrane separator and the second RO membrane separator are preferably operated independently for maintenance such as cleaning and replacement of the RO membrane (reverse osmosis membrane). Thus, it is common to install a tank or a pit between the first RO membrane separator and the second RO membrane separator so that the first RO membrane separator and the second RO membrane separator can be operated independently.

Therefore, the concentrated water discharged from the first RO membrane separator is temporarily stored in a concentrated water tank, and the pressure of the stored concentrated water is increased using a pump and then sent to the second RO membrane separator.

However, when the concentrated water discharged from the first RO membrane separator is stored in the concentrated water tank, since the concentrated water is retained in the concentrated water tank, impurities in the concentrated water may be accumulated in the concentrated water tank to increase the concentration of impurities. For example, when the concentrated water in a state in which insoluble substances in the concentrated water are aggregated is supplied to the second RO membrane separator, fouling, that is, a phenomenon in which an aggregated component and the like adhere to the reverse osmosis membrane and pores of the reverse osmosis membrane are blocked may occur in the second RO membrane separator. When the fouling progresses in the second RO membrane separator, the pressure loss of the second RO membrane separator increases, so that a supply pressure of the concentrated water is relatively insufficient, and water treatment in the second RO membrane separator cannot be sufficiently performed. In addition, a replacement time of the reverse osmosis membrane of the second RO membrane separator is accelerated.

As described above, in the configuration in which the concentrate generated in the liquid treatment unit including the reverse osmosis membrane is separated into a recovered liquid and the waste liquid by the liquid recovery unit, and the recovered liquid is supplied to the liquid treatment unit again, it is desirable to suppress occurrence of troubles and perform efficient liquid treatment.

An object of the present disclosure is to suppress occurrence of troubles and maintain efficient liquid treatment for a long period of time in a configuration in which a concentrate generated in a liquid treatment unit including a reverse osmosis membrane is separated into a recovered liquid and a waste liquid by a liquid recovery unit.

A liquid treatment apparatus according to a first aspect includes: a liquid treatment unit that includes a reverse osmosis membrane and in which a treated liquid is separated into a permeate that permeates the reverse osmosis membrane and a concentrate other than the permeate; a liquid recovery unit that includes a reverse osmosis membrane and in which the concentrate is separated into a recovered liquid that permeates the reverse osmosis membrane and a waste liquid other than the recovered liquid; and a pressure increasing means that increases a liquid pressure of the concentrate, such that a state capable of separating into the recovered liquid and the waste liquid in the liquid recovery unit continues, and that directly feeds the concentrate from the liquid treatment unit to the liquid recovery unit.

The liquid pressure of the concentrate generated by the liquid treatment unit is increased by the pressure increasing means. Then, the concentrate whose liquid pressure has been increased is supplied to the liquid recovery unit. In the concentrate, for example, the concentration of impurities is higher than that of the treated liquid, however, since the liquid pressure of the concentrate is increased, a state in which the concentrate can be efficiently separated into the recovered liquid and the waste liquid can be maintained in the liquid recovery unit.

The pressure increasing means has a structure in which the concentrate is directly fed from the liquid treatment unit to the liquid recovery unit, and there is no concentrate tank or the like between the liquid treatment unit and the liquid recovery unit. That is, the concentrate supplied from the liquid treatment unit to the liquid recovery unit is not retained during the supply, and an increase in the concentration of impurities is suppressed. Thus, in the liquid recovery unit, it is possible to suppress occurrence of troubles caused by a high impurity concentration, such as fouling and scaling, and to maintain efficient liquid treatment for a long period of time.

According to a liquid treatment apparatus according to a second aspect, in the liquid treatment apparatus according to the first aspect, the pressure increasing means includes a treated liquid pump that pressurizes the treated liquid, and a permeate valve that adjusts a flow rate of the permeate.

That is, the pressure increasing means can be achieved by a simple configuration including the treated liquid pump and the permeate valve. Since no pump or valve is provided between the liquid treatment unit and the liquid recovery unit, the liquid treatment unit and the liquid recovery unit can be directly connected with a pipe, and the concentrate can be supplied from the liquid treatment unit to the liquid recovery unit.

According to liquid treatment apparatus according to a third aspect, in the liquid treatment apparatus according to the first aspect, the pressure increasing means includes: a treated liquid pump that pressurizes the treated liquid; a second liquid treatment unit that includes a reverse osmosis membrane and separates the permeate into a secondary permeate that permeates the reverse osmosis membrane and a secondary concentrate other than the permeate; and a concentrate valve that adjusts a flow rate of the concentrate.

That is, the pressure increasing means can be achieved by a simple configuration including the treated liquid pump, the liquid treatment second unit, and the concentrate valve. Since the permeate generated in the liquid treatment unit is subjected to liquid treatment again in the liquid treatment second unit, it is possible to generate a second permeate in which impurities are further removed as compared with the permeate. Even when a supply pressure of the liquid recovery unit becomes too high due to a high pressure increasing effect of the liquid treatment second unit, a supply pressure of the concentrate to the liquid recovery unit can be adjusted to a proper pressure using the concentrate valve because the concentrate valve is provided.

According to a liquid treatment apparatus according to a fourth aspect, in the liquid treatment apparatus according to the first aspect, the pressure increasing means includes a concentrate pump that pressurizes the concentrate and a concentrate valve that adjusts a flow rate of the concentrate pressurized by the concentrate pump.

That is, the pressure increasing means can be achieved by a simple configuration including the concentrate pump and the concentrate valve. Since the concentrate pump directly pressurizes the concentrate, the pressure of the concentrate can be efficiently increased to a desired pressure.

According to a liquid treatment apparatus according to a fifth aspect, in the liquid treatment apparatus according to any one of the first to fourth aspects, a liquid recovery rate obtained by dividing the flow rate of the permeate by the flow rate of the treated liquid is 75% or more and 90% or less in the liquid treatment unit.

By setting the liquid recovery rate to 75% or more and 90% or less, as much permeate as possible is generated from the treated liquid, deterioration of water quality of the permeate is suppressed, and, in addition, excessive concentration of impurities in the concentrate can be suppressed.

According to a liquid treatment apparatus according to a sixth aspect, in the liquid treatment apparatus according to any one of the first to fifth aspects, the pressure increasing means increases the liquid pressure of the concentrate according to an increase in pressure loss of the liquid recovery unit.

When the pressure loss of the liquid recovery unit increases, the liquid pressure of the concentrate increases, so that it is possible to suppress a decrease in efficiency of separating the concentrate into the recovered liquid and the waste liquid in the liquid recovery unit. A stable operation of the liquid recovery unit can be achieved.

A pure water production system according to a seventh aspect includes the liquid treatment apparatus according to any one of the first to sixth aspects, and a pure water production unit that generates pure water from the permeate generated by the liquid treatment apparatus.

Since the pure water production system includes the liquid treatment apparatus according to any one of the first to seventh aspects, it is possible to perform efficient liquid treatment and generate a permeate.

In the pure water production unit, pure water can be efficiently produced using this permeate.

A liquid treatment method according to an eighth aspect is a liquid treatment method of treating a treated liquid using the liquid treatment apparatus according to any one of the first to fifth aspects, the liquid treatment method comprising increasing the liquid pressure of the concentrate in the pressure increasing means according to an increase in pressure loss of the liquid recovery unit.

That is, in the liquid treatment method, since the liquid treatment apparatus according to any one of the first to fifth aspects is used, in the liquid recovery unit, it is possible to suppress occurrence of troubles caused by a high impurity concentration, such as fouling and scaling, and to maintain efficient liquid treatment for a long period of time.

When the pressure loss of the liquid recovery unit increases, the liquid pressure of the concentrate increases, so that it is possible to suppress the decrease in efficiency of separating the concentrate into the recovered liquid and the waste liquid in the liquid recovery unit. A stable operation of the liquid recovery unit can be achieved.

According to the present disclosure, it is possible to suppress occurrence of troubles and maintain efficient liquid treatment in the configuration in which the concentrate generated in the liquid treatment unit including the reverse osmosis membrane is separated into the recovered liquid and the waste liquid by the liquid recovery unit.

BRIEF DESCRIPTION OF THE SEVERAL VIEWS OF THE DRAWINGS

FIG. 11 is a configuration diagram showing a desalination apparatus which is an example of a liquid treatment apparatus according to a second embodiment.

FIG. 12 is a graph showing pressures of a water treatment unit and a water recovery unit in the desalination apparatus of the second embodiment with elapse of operation time.

DESCRIPTION OF SPECIFIC EMBODIMENTS OF THE INVENTION

Hereinafter, a desalination apparatus 24 of a first embodiment and an ultrapure water production system 12 including the desalination apparatus 24 will be described with reference to the drawings. The desalination apparatus 24 is an example of a water treatment apparatus according to the technology of the present disclosure.

Hereinafter, the term "flow direction" refers to a flow direction of treated water. The terms "upstream" and "downstream" mean "upstream" and "downstream" in the flow direction of the treated water, respectively.

Figure 1:
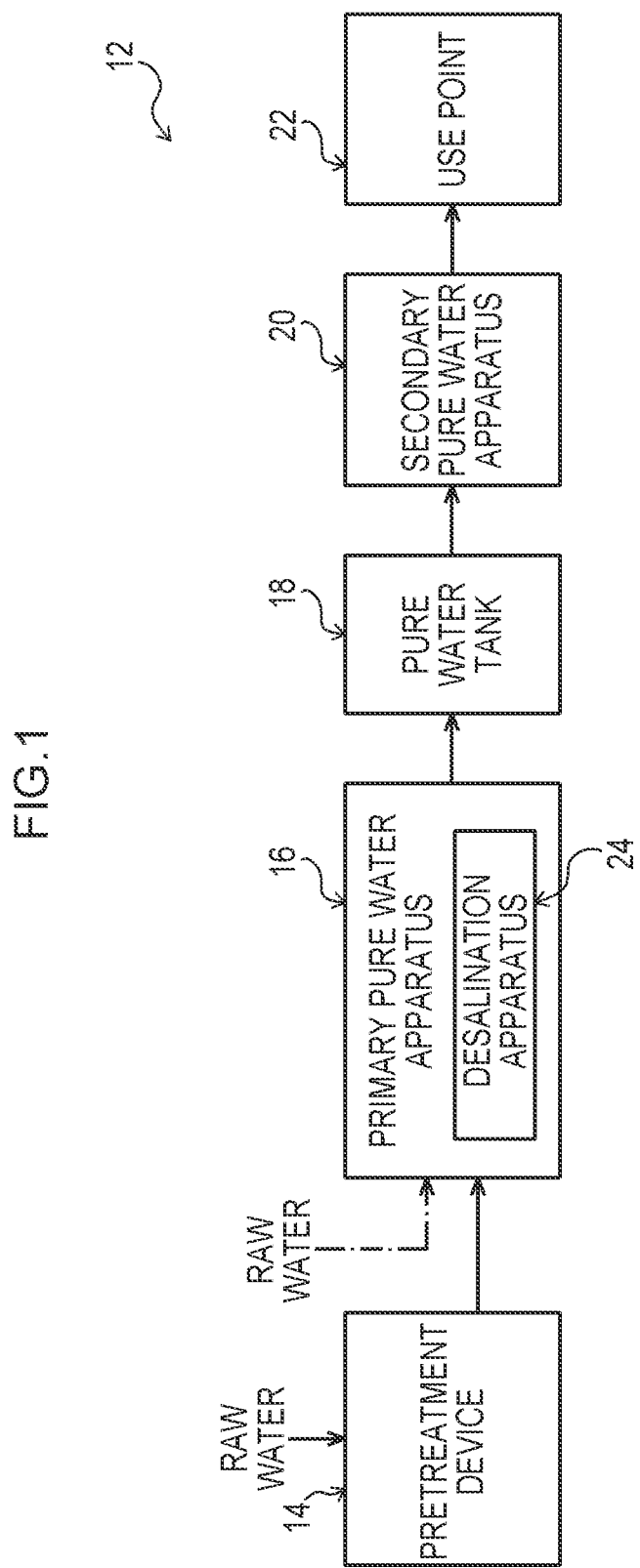
FIG. 1 is a configuration diagram showing an ultrapure water production system including a desalination apparatus which is an example of a liquid treatment apparatus of a first embodiment.

As shown in FIG. 1, the ultrapure water production system 12 includes a pretreatment device 14, a primary pure water apparatus 16, a pure water tank 18, and a secondary pure water apparatus 20.

The pretreatment device 14 pretreats raw water used for producing ultrapure water. As the pretreatment device 14, for example, a flocculation precipitation treatment device, a turbidity removal device such as a microfilter or an ultrafiltration device, and an activated carbon adsorption device are installed. As the raw water, for example, fresh water such as city water, well water, or industrial water is used. However, depending on the concentration of impurities in the raw water, it is also possible to send the raw water to the primary pure water apparatus 16 without performing the pretreatment by the pretreatment device 14 as indicated by a one-dot chain line in FIG. 1. In the technology of the present disclosure, the pretreated raw water is also described as "raw water".

The treated water pretreated by the pretreatment device 14 is subjected to each treatment such as adsorption, filtration, and ion exchange in the primary pure water apparatus 16, so that impurities that cannot be removed by the pretreatment device 14 are removed, and primary pure water is generated. In the present embodiment, the desalination apparatus 24 is included in the primary pure water apparatus 16. The desalination apparatus 24 is an apparatus that removes impurities from treated water by passing the treated water through a reverse osmosis membrane 56 (details will be described later) to obtain permeated water that has permeated through the reverse osmosis membrane 56 and concentrated water other than the permeated water. A normal-pressure type degassing apparatus may be installed at a stage prior to the desalination apparatus 24. In general, an ultraviolet irradiation device, a mixed bed ion exchange device, an electric regeneration type ion exchange device, a degassing membrane device, and the like are installed at a subsequent stage of the desalination apparatus 24. The primary pure water generated by the primary pure water apparatus 16 is temporarily stored in the pure water tank 18, and then sent to the secondary pure water apparatus 20.

The primary pure water is subjected to each treatment such as adsorption, filtration, and ion exchange in the secondary pure water apparatus 20, and impurities that cannot be removed by the primary pure water apparatus 16 are further removed to generate secondary pure water. The secondary pure water is sent to a use point 22 and used. The water may be sent to the use point 22 at the stage of temporary pure water.

Figure 2:
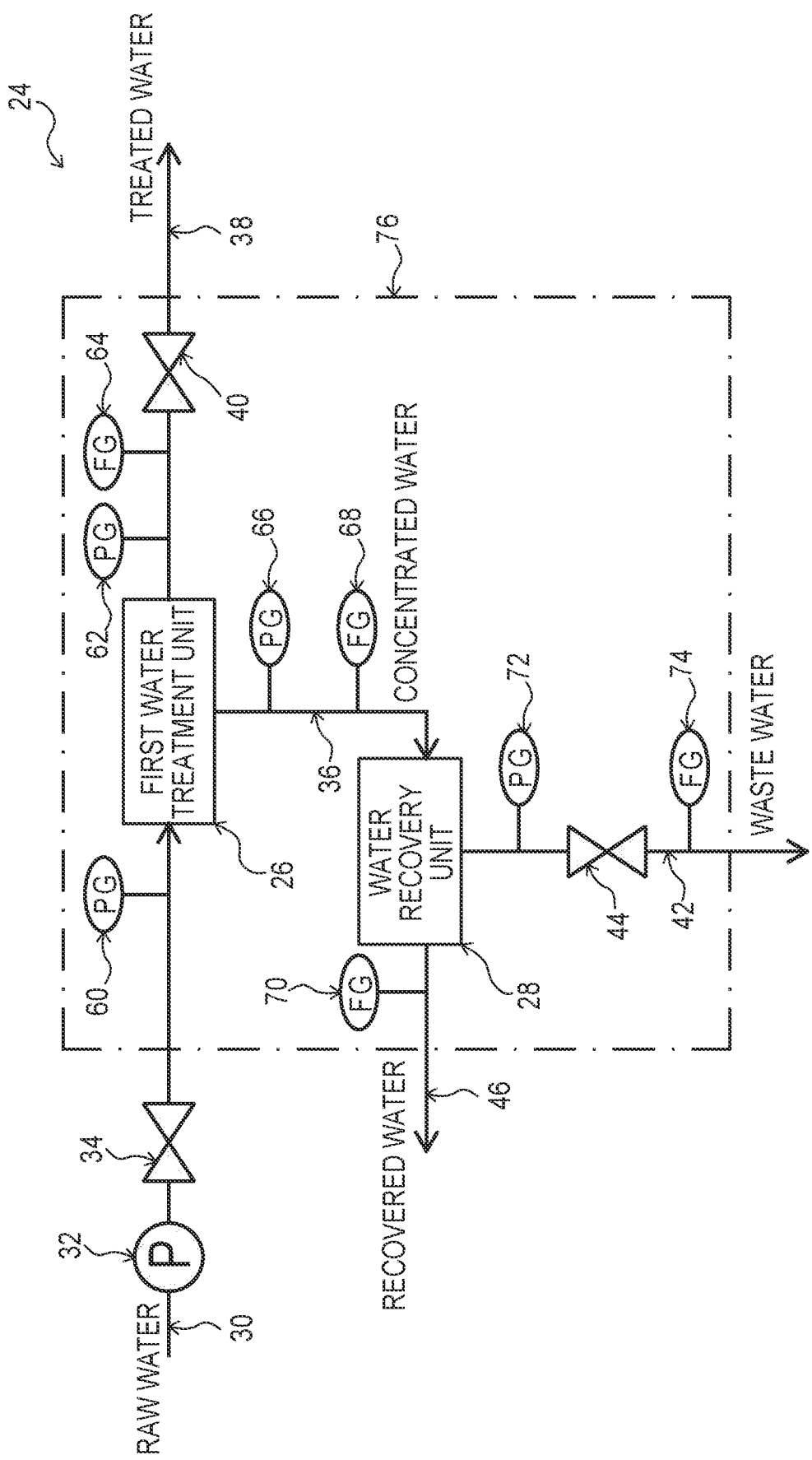
FIG. 2 is a configuration diagram showing the desalination apparatus which is the example of the liquid treatment apparatus of the first embodiment.

As shown in FIG. 2, the desalination apparatus 24 includes a first water treatment unit 26 and a water recovery unit 28. The treated water is supplied from the upstream side to the first water treatment unit 26 by a raw water pipe 30. The treated water may be raw water supplied to the pretreatment device 14 or water obtained by subjecting the raw water to a predetermined treatment. Hereinafter, a case where raw water is used as treated water will be described as an example.

The raw water pipe 30 is provided with a raw water pump 32 and a raw water valve 34 from the upstream side.

The raw water pump 32 is a pump that increases the pressure of the raw water supplied to the first water treatment unit 26 and supplies the raw water to the first water treatment unit 26. An output range is set such that a high pressure is applied to the raw water as compared with a raw water pump 120 of a first comparative example and a second comparative example to be described later, and the water recovery unit 28 can be continuously operated.

Figure 3:
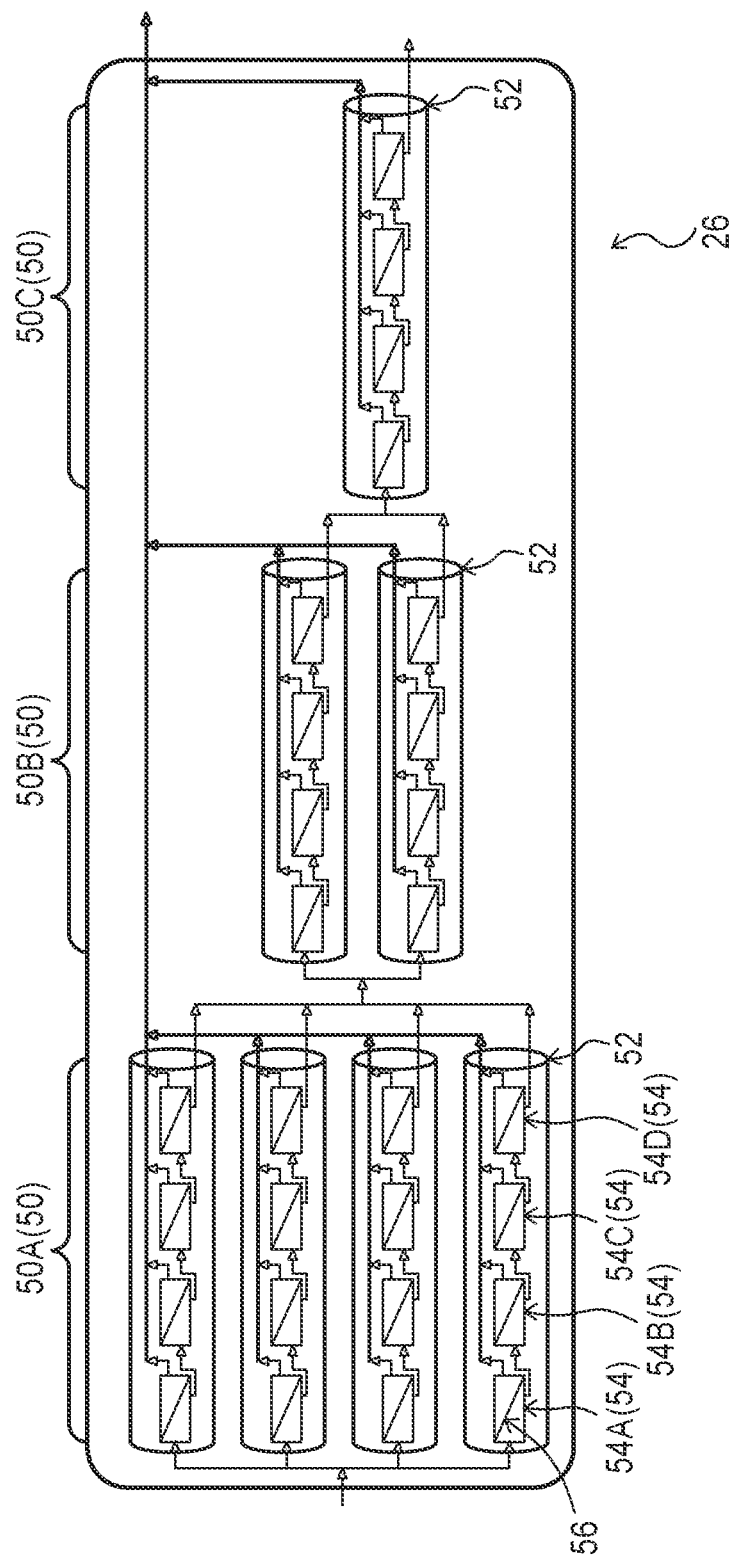
FIG. 3 is a configuration diagram showing a water treatment unit of the desalination apparatus which is the example of the liquid treatment apparatus of the first embodiment.

As shown in FIG. 3, the first water treatment unit 26 has one or a plurality of banks 50. In the example shown in FIG. 3, there are three banks including a first bank 50A, a second bank 50B, and a third bank 50C. In the case of the configuration having a plurality of banks, the plurality of banks 50 are arranged in series along the flow direction.

Each of the banks 50 has one or more vessels 52. In the example shown in FIG. 3, the first bank 50A has four vessels 52, the second bank 50B has two vessels 52, and the third bank 50C has one vessel 52. When the bank 50 has the plurality of vessels 52, the plurality of vessels 52 are arranged in parallel with the flow direction.

The vessel 52 includes a plurality of modules 54. In the example shown in FIG. 3, four modules 54A to 54D are arranged in series along the flow direction in one vessel 52.

Each of the modules 54 includes the reverse osmosis membrane 56 therein. The treated water that has flowed into the module 54 is separated into permeated water that permeates through the reverse osmosis membrane 56 and concentrated water other than the permeated water. For example, as shown in FIG. 2, the permeated water generated by the module 54A on the most upstream side in the one vessel 52 is sent from the first water treatment unit 26 to the primary pure water apparatus 16 through the treatment water pipe 38. On the other hand, the concentrated water generated in the module 54 flows into the second module 54B from the upstream side, and is separated again into the permeated water that permeates the reverse osmosis membrane 56 and the concentrated water other than the permeated water. In this manner, in one vessel 52, the operation of separating the treated water into the permeated water and the concentrated water is repeatedly performed.

The concentrated water generated in the plurality of vessels 52 of the first bank 50A is once merged and then flows as treated water into any of the plurality of vessels 52 of the second bank 50B. Similarly, in the vessel 52 of the second bank 50B, the treated water is separated into the permeated water and the concentrated water by the module 54, and the permeated water is sent to the primary pure water apparatus 16 through the treatment water pipe 38. After the concentrated water is merged, in the vessel 52 of the third bank 50C, the treated water is separated into the permeated water and the concentrated water by the plurality of modules 54, and the permeated water is sent from the first water treatment unit 26 to the primary pure water apparatus 16 through the treatment water pipe 38. On the other hand, as shown in FIG. 2, the concentrated water generated by the module 54 is sent to the water recovery unit 28 through a concentrated water pipe 36.

As described above, in one vessel 52, the treated water that has not passed through the reverse osmosis membrane 56 becomes the concentrated water in all of the four modules 54 arranged in series along the flow direction of the treated water. On the other hand, the treated water that has permeated through the reverse osmosis membrane 56 in any one of the modules 54 becomes the permeated water.

In the first water treatment unit 26, since the plurality of modules 54 are arranged in series along the flow direction of the treated water, a recovery rate of the first water treatment unit 26 can be increased as compared with a configuration in which one module 54 is disposed in series. For example, when the recovery rate of the module 54 alone is 10 to 20%, the recovery rate of the first water treatment unit 26 as a whole is 75 to 90%. That is, the water recovery rate is increased to satisfy a condition close to a condition where scale occurs. Specifically, for example, a Langelier index is preferably 0 or less, more preferably −1 to 0, still more preferably −0.5 to 0, and it is preferable to concentrate such that a silica concentration is concentrated to about 80 to 120 ppm.

In the first bank 50A of the first water treatment unit 26, since the plurality of vessels 52, that is, the modules 54 are arranged in parallel in the flow direction of the treated water, a larger amount of treated water can be treated as compared with a configuration in which one module 54 is disposed in parallel. The number of the modules 54 arranged in a parallel direction decreases toward the downstream side. That is, the number of the modules 54 arranged in the parallel direction is four (four columns) in the first bank 50A, two (two columns) in the second bank 50B, and one (one column) in the third bank 50C. Since the amount of the treated water treated by the module 54 decreases toward the downstream side, the treatment of the treated water is not affected even if the number of the modules 54 arranged in the parallel direction decreases toward the downstream side as described above. That is, it is possible to reliably treat the treated water while simplifying the configuration. A plurality of the first water treatment units 26 may be arranged in parallel with each other in the flow direction.

Figure 4:
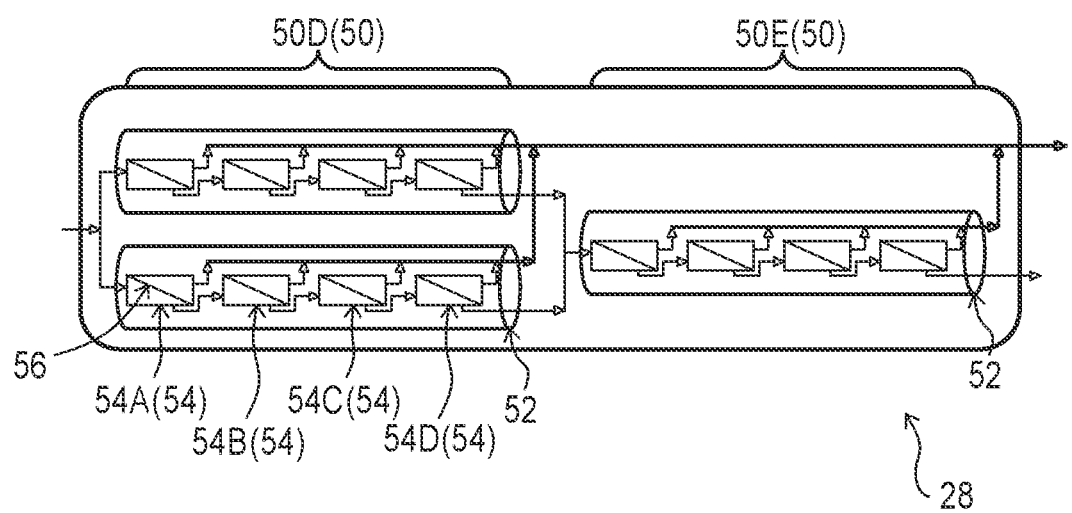
FIG. 4 is a configuration diagram showing a water recovery unit of the desalination apparatus which is the example of the liquid treatment apparatus of the first embodiment.

As shown in FIG. 4, the water recovery unit 28 has one or a plurality of banks 50. In the example shown in FIG. 4, the water recovery unit 28 has two banks 50, which are a first bank 50D and a second bank 50E. In the case of the configuration having the plurality of banks 50, the plurality of banks 50 are arranged in series along the flow direction of the treated water.

Each of the banks 50 in the water recovery unit 28 has one or a plurality of vessels 52. In the bank (the first bank 50D in the example shown in FIG. 4) having the plurality of vessels 52, the vessels 52 are arranged in parallel in the flow direction of the treated water. The vessel 52 has the plurality of modules 54, and in one vessel 52, the four modules 54A to 54D are arranged in series along the flow direction of the treated water.

Also in the water recovery unit 28, similarly to the first water treatment unit 26, in one vessel 52, the treated water that has not passed through the reverse osmosis membrane 56 in all of the four modules 54 arranged in series along the flow direction of the treated water is concentrated and becomes the waste water. On the other hand, the treated water that has permeated through the reverse osmosis membrane 56 in any one of the modules 54 becomes recovered water. Since the treated water supplied to the water recovery unit 28 is the concentrated water generated in the first water treatment unit 26, the flow rate thereof is smaller than that of the raw water which is the treated water in the first water treatment unit 26. Therefore, the water recovery unit 28 can be made smaller than the first water treatment unit 26. A plurality of the water recovery units 28 may also be arranged in parallel with each other in the flow direction.

The first water treatment unit 26 and the water recovery unit 28 are directly connected by the concentrated water pipe 36. The concentrated water generated by the first water treatment unit 26 is supplied as treated water directly to the water recovery unit 28. Then, in the water recovery unit 28, the concentrated water is separated into recovered water that has passed through the reverse osmosis membrane 56 and waste water other than the recovered water. Although the recovered water may be recovered from the desalination apparatus 24 and sent to another apparatus, in the present embodiment, the recovered water is recycled water. That is, the recovered water passes through a recovered water pipe 46, is returned to the raw water pipe 30 on the upstream side of the raw water pump 32, and is reused in the desalination apparatus 24.

As shown in FIG. 2, the desalination apparatus 24 has a treatment water valve 40. The treatment water valve 40 is provided in the treatment water pipe 38 through which the permeated water flows out as treated water from the first water treatment unit 26. By adjusting the treatment water valve 40, pressure loss of the treatment water pipe 38 can be adjusted, and the flow rate of the treated water can be increased or decreased.

In the present embodiment, as described above, the output of the raw water pump 32 is higher than the output of the raw water pump 120 of the first comparative example and the second comparative example. The raw water pump 32, the concentrated water pipe 36, and the treatment water valve 40 form an example of pressure increasing means.

In addition, the desalination apparatus 24 includes a drain valve 44. The drain valve 44 is provided in a drain pipe 42 through which the concentrated water flows out as waste water from the water recovery unit 28. The pressure loss of the drain pipe 42 can be adjusted by adjusting the drain valve 44.

The raw water pipe 30 is provided with a raw water pressure sensor 60 between the raw water valve 34 and the first water treatment unit 26. The raw water pressure sensor 60 can detect the pressure of water flowing through the raw water pipe 30.

In the treatment water pipe 38, a treatment water pressure sensor 62 and a treatment water flow rate sensor 64 are provided between the first water treatment unit 26 and the treatment water valve 40. The treatment water pressure sensor 62 can detect the water pressure of the treated water flowing through the treatment water pipe 38. The treatment water flow rate sensor 64 can detect the flow rate of the treated water flowing through the treatment water pipe 38.

A concentrated water pressure sensor 66 and a concentrated water flow rate sensor 68 are provided at the concentrated water pipe 36. The concentrated water pressure sensor 66 can detect the water pressure of the concentrated water flowing through the concentrated water pipe 36. The concentrated water flow rate sensor 68 can detect the flow rate of the concentrated water flowing through the concentrated water pipe 36.

A recovered water pressure sensor 70 is provided at the recovered water pipe 46. The recovered water pressure sensor 70 can detect the water pressure of the recovered water flowing through the recovered water pipe 46.

A waste water pressure sensor 72 and a waste water flow rate sensor 74 are provided at the drain pipe 42. The waste water pressure sensor 72 is provided between the water recovery unit 28 and the drain valve 44, and can detect the water pressure of the waste water flowing through the drain pipe 42. The waste water flow rate sensor 74 is provided downstream of the drain valve 44, and can detect the flow rate of the waste water flowing through the drain pipe 42.

In the present embodiment, the first water treatment unit 26, the water recovery unit 28, the treatment water valve 40, the drain valve 44, the raw water pressure sensor 60, the treatment water pressure sensor 62, the treatment water flow rate sensor 64, the concentrated water pressure sensor 66, the concentrated water flow rate sensor 68, the waste water pressure sensor 72, and the waste water flow rate sensor 74 are collectively installed in a single skit 76.

Next, the operation of the desalination apparatus 24 of the first embodiment and a liquid treatment method will be described while being compared with the desalination apparatus and the liquid treatment method of Comparative Example. In the first comparative example and the second comparative example described below, elements and the like similar to those in the first embodiment are denoted by the same reference numerals, and detailed description thereof is omitted.

In the desalination apparatus 24 of the first embodiment, the raw water as the treated water is supplied to the first water treatment unit 26. In the first water treatment unit 26, the raw water is separated into the permeated water that has permeated through the reverse osmosis membrane 56 (see FIG. 3) and the concentrated water other than the permeated water. The concentrated water is water in which impurities in the treated water are concentrated, and is supplied to the water recovery unit 28 through the concentrated water pipe 36.

In the water recovery unit 28, the supplied concentrated water is separated into recovered water that has passed through the reverse osmosis membrane 56 (see FIG. 4) and waste water other than the recovered water. The recovered water is water obtained by removing impurities from the concentrated water. The recovered water can be supplied again to the first water treatment unit 26 to be reused as treated water (recycled water), and the treated water can be efficiently generated. The recovered water may be used for purposes other than the treated water in the desalination apparatus 24.

The raw water used in the water treatment apparatus of the technology of the present disclosure contains a scale component, and the concentration of the scale component increases in the concentrated water after desalination. In addition to the scale component, the raw water also contains various impurities that cause fouling and scaling in the water recovery unit 28, that is, a fouling component and the scale component. Since the raw water is separated into the permeated water and the concentrated water by the first water treatment unit 26, the concentration of the fouling component and the scale component in the concentrated water is higher than the concentration of the raw water.

As in the present embodiment, when the liquid treatment apparatus is the desalination apparatus 24, for example, when a flux of the raw water is 0.6 m/d, operating pressure at an inlet portion (the pressure is hereinafter referred to as "inlet operating pressure") of the first water treatment unit 26 is set to 1.0 MPa or more and 1.5 MPa or less. On the other hand, in the water recovery unit 28, since the concentration of the fouling component of the concentrated water is high, the operation is performed at a recovery rate different from that of the first water treatment unit 26, for example, 30% or more and 65% or less. In this case, since the concentration of the fouling component is high in the concentrated water, the inlet operating pressure is set to a higher pressure in the water recovery unit 28 as compared with the first water treatment unit 26. For example, when the flux of the concentrated water is 0.6 m/d, the operating pressure at the inlet portion of the water recovery unit 28 is set to 1.0 MPa or more and 1.8 MPa or less. In other words, as the ability of the raw water pump 32, the ability to the extent that the inlet operating pressure can be achieved is required.

Figure 5:
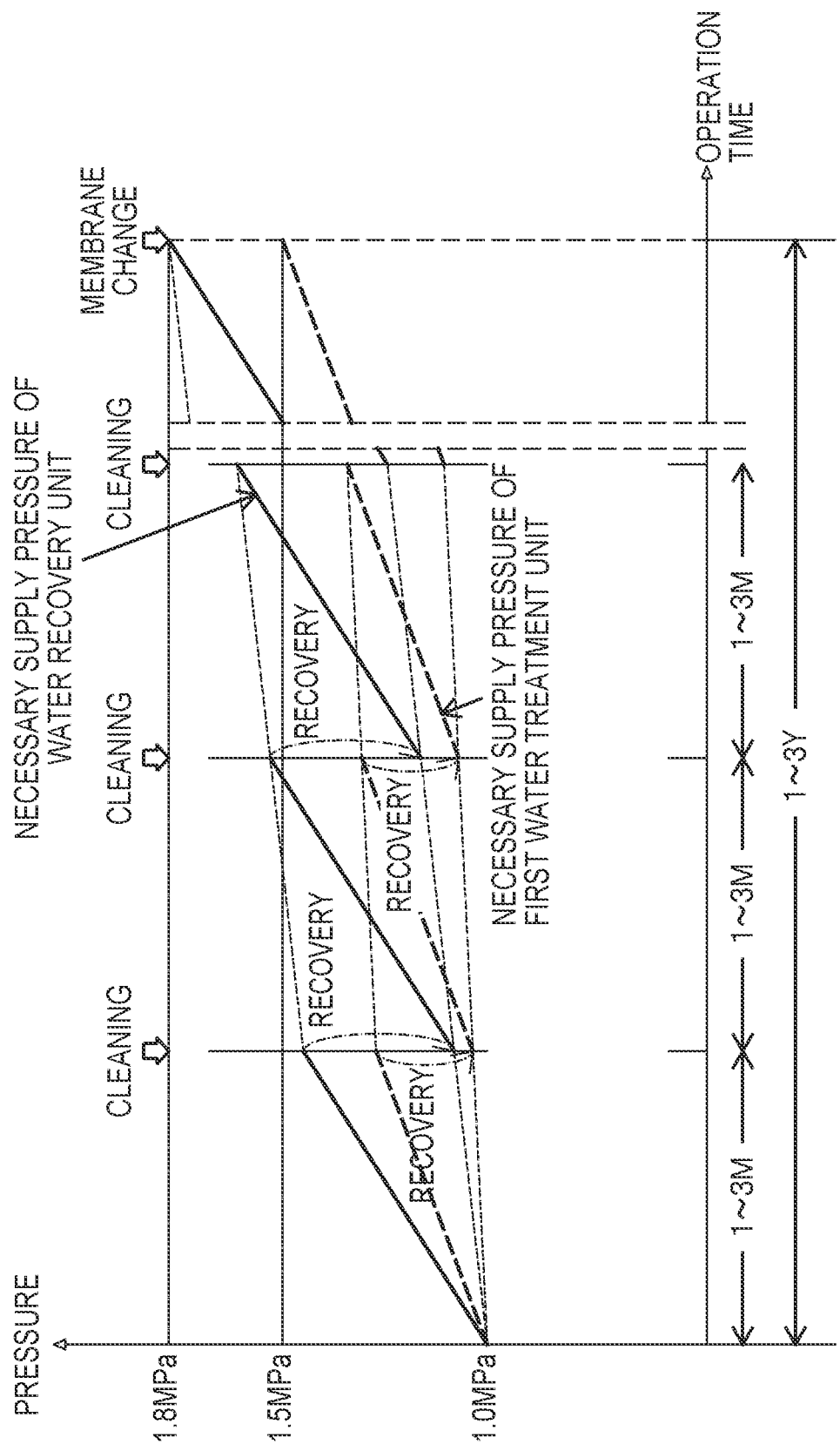
FIG. 5 is a graph showing pressures of the water treatment unit and the water recovery unit in the desalination apparatus with elapse of operation time.

FIG. 5 shows a change over time of a necessary supply pressure applied for operating each of the first water treatment unit 26 and the water recovery unit 28. The numerical range of the necessary supply pressure of the first water treatment unit 26 is 1.0 MPa or more and 1.5 MPa or less as described above. In the first water treatment unit 26, fouling gradually progresses with elapse of operation time, and therefore, in accordance therewith the necessary supply pressure gradually increases. Similarly, the numerical range of the necessary supply pressure of the water recovery unit 28 is 1.0 MPa or more and 1.8 MPa or less, and as with the necessary supply pressure of the first water treatment unit 26, the necessary supply pressure gradually increases due to the progress of fouling with elapse of the operation time.

At the start of the operation, the values of the necessary supply pressures of the first water treatment unit 26 and the water recovery unit 28 are the same (1 MPa in the example of FIG. 5). Since both the raw water and the concentrated water contain the fouling component, the necessary supply pressure increases with elapse of the operation time; however, in particular, since the concentration of the fouling component in the concentrated water is higher than that in the raw water, a rate of increase in the necessary supply pressure of the water recovery unit 28 is large.

The fouling component can be removed by cleaning each of the first water treatment unit 26 and the water recovery unit 28 at predetermined time intervals (1 to 3 M in the example of FIG. 5). As a result, the necessary supply pressure is reduced in both the first water treatment unit 26 and the water recovery unit 28; however, even immediately after cleaning, the necessary supply pressure is slightly higher than that at the start of operation or immediately after cleaning performed one stage before the start of operation. Therefore, even if such periodic cleaning is repeatedly performed to recover the first water treatment unit 26 and the water recovery unit 28, the necessary supply pressure substantially gradually increases with the operation. As indicated by 1 to 3Y in FIG. 5, when the necessary supply pressure reaches a predetermined value (1.5 MPa in the first water treatment unit 26 and 1.8 MPa in the water recovery unit 28), the module 54 is replaced. A replacement time of the reverse osmosis membrane 56 can be set, for example, such that operation costs of the first water treatment unit 26 and the water recovery unit 28 are further reduced.

As can be seen from the above description, although the inlet operating pressures of the first water treatment unit 26 and the water recovery unit 28 are the same at the start of operation, the inlet operating pressure of the water recovery unit 28 is larger than that of the first water treatment unit 26 thereafter.

Here, a desalination apparatus 104 of the first comparative example shown in FIG. 6 will be described.

In the desalination apparatus 104 of the first comparative example, a concentrated water pipe 106 is divided into two pipes in the middle, that is, into an upstream portion 106A and a downstream portion 106B. A concentrated water tank 108 is provided between the upstream portion 106A and the downstream portion 106B, and the concentrated water generated in the first water treatment unit 26 is temporarily stored in the concentrated water tank 108. The amount of the concentrated water stored in the concentrated water tank 108 can be calculated from a water level detected by a water level sensor 116.

A concentrated water valve 110 is provided at the upstream portion 106A of the concentrated water pipe 106, so that the amount of the concentrated water flowing from the first water treatment unit 26 to the concentrated water tank 108 can be adjusted.

A concentrated water pump 112, a concentrated water valve 114, and a concentrated water pressure sensor 78 are provided at the downstream portion 106B of the concentrated water pipe 106, that is, between the concentrated water tank 108 and the water recovery unit 28. By operating the concentrated water pump 112, the concentrated water stored in the concentrated water tank 108 can be pressurized and supplied to the water recovery unit 28. By adjusting an opening degree of the concentrated water valve 114, the concentrated water can be supplied to the water recovery unit 28 at a desired pressure and a desired flow rate. As described above, although the necessary supply pressure of the water recovery unit 28 is larger than the necessary supply pressure of the first water treatment unit 26, the necessary supply pressure can be secured as the supply pressure of the concentrated water to the water recovery unit 28 by increasing the pressure of the concentrated water by the concentrated water pump 112. Therefore, the raw water pump 120 of the desalination apparatus 104 of the first comparative example can have a lower output than the raw water pump 32 of the desalination apparatus 24 of the first embodiment.

In the desalination apparatus 104 of the first comparative example, the concentrated water tank 108 is provided in the middle of the concentrated water pipe 106 as described above, and the concentrated water tank 108 and the water level sensor 116 are installed in a skit 118B. The first water treatment unit 26, the concentrated water valve 110, the raw water pressure sensor 60, the treatment water pressure sensor 62, the concentrated water pressure sensor 66, the treatment water flow rate sensor 64, and the concentrated water flow rate sensor 68 are installed in a skit 118A, and the water recovery unit 28, the drain valve 44, and the waste water pressure sensor 72 are installed in a skit 118C.

When the concentrated water has a high-concentration scale component, it is desirable to suppress precipitation of the scale component in the water recovery unit 28. For example, by injecting a scale inhibitor into the concentrated water to improve a concentration rate of the scale component, the amount of the recovered water can be increased, so that the recovery rate can be increased. A pH adjusting agent may be injected into the concentrated water to adjust the pH. Since the desalination apparatus 104 of the first comparative example includes the concentrated water tank 108, it is easy to inject these agents.

In the desalination apparatus 104 of the first comparative example, the concentrated water is temporarily stored in the concentrated water tank 108. Thus, pressurization management of the concentrated water by the concentrated water pump 112 for suppressing fouling in the water recovery unit 28 and flow rate management of the concentrated water by control of the concentrated water valve 114 are separately performed. In addition, since the first water treatment unit 26 and the water recovery unit 28 have different degrees of increase in supply pressure required for operation (amounts of increase per hour), the operation of the water recovery unit 28 is controlled under operation conditions (supply pressure, supply amount, etc., of treated water) different from those of the first water treatment unit 26.

However, in the desalination apparatus 104 of the first comparative example, a flow of the concentrated water from the first water treatment unit 26 to the water recovery unit 28 is divided by the concentrated water tank 108. Thus, the first water treatment unit 26 and the water recovery unit 28 need to be placed under different operation controls.

In addition, when a concentrate is stored in the concentrated water tank 108 as in the first comparative example, impurities contained in the concentrated water are concentrated to near the limit where scale occurs, and therefore, the impurities may be retained in the concentrated water tank 108. For example, an impurity concentration of the concentrate may temporarily and locally exceed a saturation concentration due to influences of evaporation of moisture, dissolution of carbonic acid, and the like. In addition, a concentrated turbid content may serve as a nucleus to promote the precipitation of the scale. Therefore, scaled fine particles gradually increase in the concentrated water in the tank as the operation is continued. For example, a coagulant added to the raw water may be concentrated in the concentrated water tank 108. In the concentrated water tank 108, a mineral component contained in the raw water is concentrated in the concentrated water tank 108, and the concentrated water tank 108 may be in a state of being rich in nutrients for microorganisms such as viable bacteria, and in this case, propagation of microorganisms is likely to occur. When the concentrated water in this state is supplied to the water recovery unit 28, scaling and fouling in the module 54 of the water recovery unit 28 may be promoted by insoluble components such as scale, a concentrated coagulant, and microorganisms.

Figure 7:
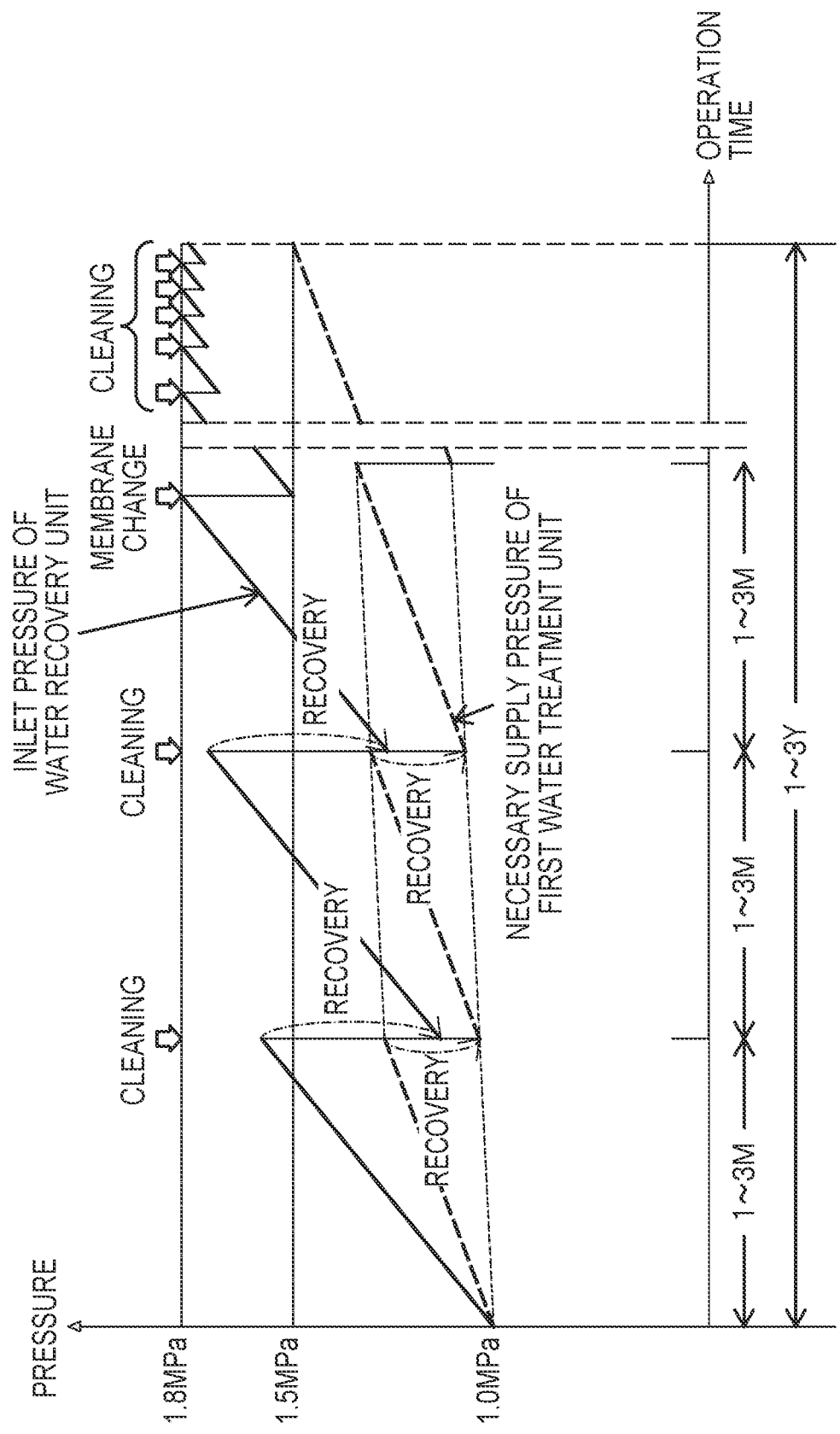
FIG. 7 is a graph showing pressures of the water treatment unit and the water recovery unit in the desalination apparatus of the first comparative example with elapse of the operation time.

FIG. 7 shows a change over time of the necessary supply pressure necessary for operating each of the first water treatment unit 26 and the water recovery unit 28 in the desalination apparatus 104 of the first comparative example. In the desalination apparatus 104 of the first comparative example, the pressure of the concentrated water is increased by the concentrated water pump 112 so as to obtain a pressure at which the water recovery unit 28 can be operated.

Also in the desalination apparatus 104 of the first comparative example, the necessary supply pressure at the start of operation is the same (1 MPa) as the example shown in FIG. 5. However, the degree of increase (rate of increase per unit time) in the necessary supply pressure in the water recovery unit 28 is larger than the example shown in FIG. 5. For this reason, a time for reaching the upper limit of the pressure (1.8 MPa) set as a reference for membrane replacement (actually, replacement of the module 54 (see FIGS. 3 and 4)) is short. For example, when viewed at a time interval of 1 to 3Y, it is necessary to frequently perform cleaning in order to continue the operation of the water recovery unit 28 in this state.

Figure 8:
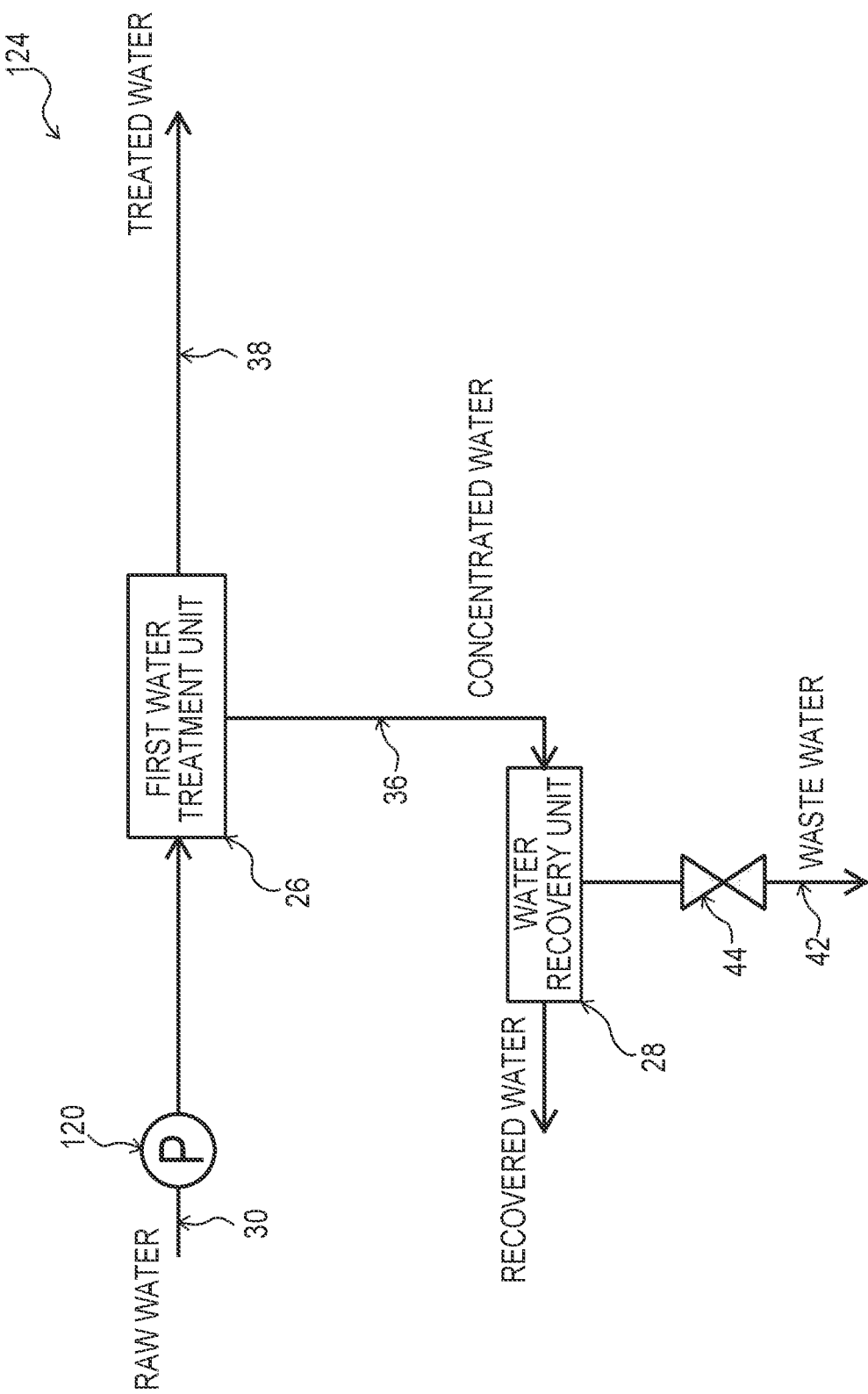
FIG. 8 is a configuration diagram showing the desalination apparatus of a second comparative example.

In order to eliminate the inconvenience caused by providing the concentrated water tank 108 as described above, for example, it is conceivable to use a desalination apparatus 124 of the second comparative example shown in FIG. 8. Although the desalination apparatus 124 includes the raw water pump 120 similarly to the desalination apparatus 104 of the first comparative example, the output of the raw water pump 120 is lower than the output of the raw water pump 32 of the first embodiment. However, the raw water pump 120 has such an output that water pressure necessary for separating raw water (treated water) into treated water and concentrated water in the first water treatment unit 26 is applied to the raw water.

In the desalination apparatus 124 of the second comparative example, the first water treatment unit 26 and the water recovery unit 28 are directly connected by the concentrated water pipe 36, and the concentrated water is not retained between the first water treatment unit 26 and the water recovery unit 28. Therefore, it is also possible to suppress a situation in which fouling is likely to occur in the water recovery unit 28 due to an insoluble component retained in the concentrated water tank 108 (see FIG. 6).

However, in the desalination apparatus 124 of the second comparative example, the concentrated water pump 112 (see FIG. 6) provided in the desalination apparatus 104 of the first comparative example is not provided. Therefore, as a result, the raw water pump 32 is responsible for the supply pressure of the concentrated water to the water recovery unit 28. However, in the desalination apparatus 124 of the second comparative example, a supply ability of the raw water pump 32 is set to such an extent that the first water treatment unit 26 can be operated (raw water can be separated into permeated water and concentrated water), specifically, 1.0 MPa or more and 1.5 MPa or less. Since there is the pressure loss in the first water treatment unit 26, an actual pressure of the concentrated water flowing out of the water recovery unit 28 further decreases. Since the necessary supply pressure of the water recovery unit 28 is 1.0 MPa or more and 1.8 MPa or less, the pressure may be insufficient to separate the concentrated water into the recovered water and the waste water in the water recovery unit 28.

On the other hand, in the desalination apparatus 24 of the first embodiment, the first water treatment unit 26 and the water recovery unit 28 are directly connected by the concentrated water pipe 36, and there is no site where the concentrated water is retained in a path through which the concentrated water flows from the first water treatment unit 26 to the water recovery unit 28. Since the concentrated water is not retained, aggregation of an aggregated component in the concentrated water can be suppressed. As a result, fouling in the water recovery unit 28 can be suppressed. As a result, an increase in pressure necessary for the operation of the water recovery unit 28 can also be suppressed, and a large flow rate of the treated water (concentrated water) flowing through the water recovery unit 28 can be secured. It is possible to reliably return the recovered water to the first water treatment unit 26 and to perform efficient liquid treatment for a long period of time by reducing a frequency of cleaning and membrane replacement of the water recovery unit 28.

Figure 9:
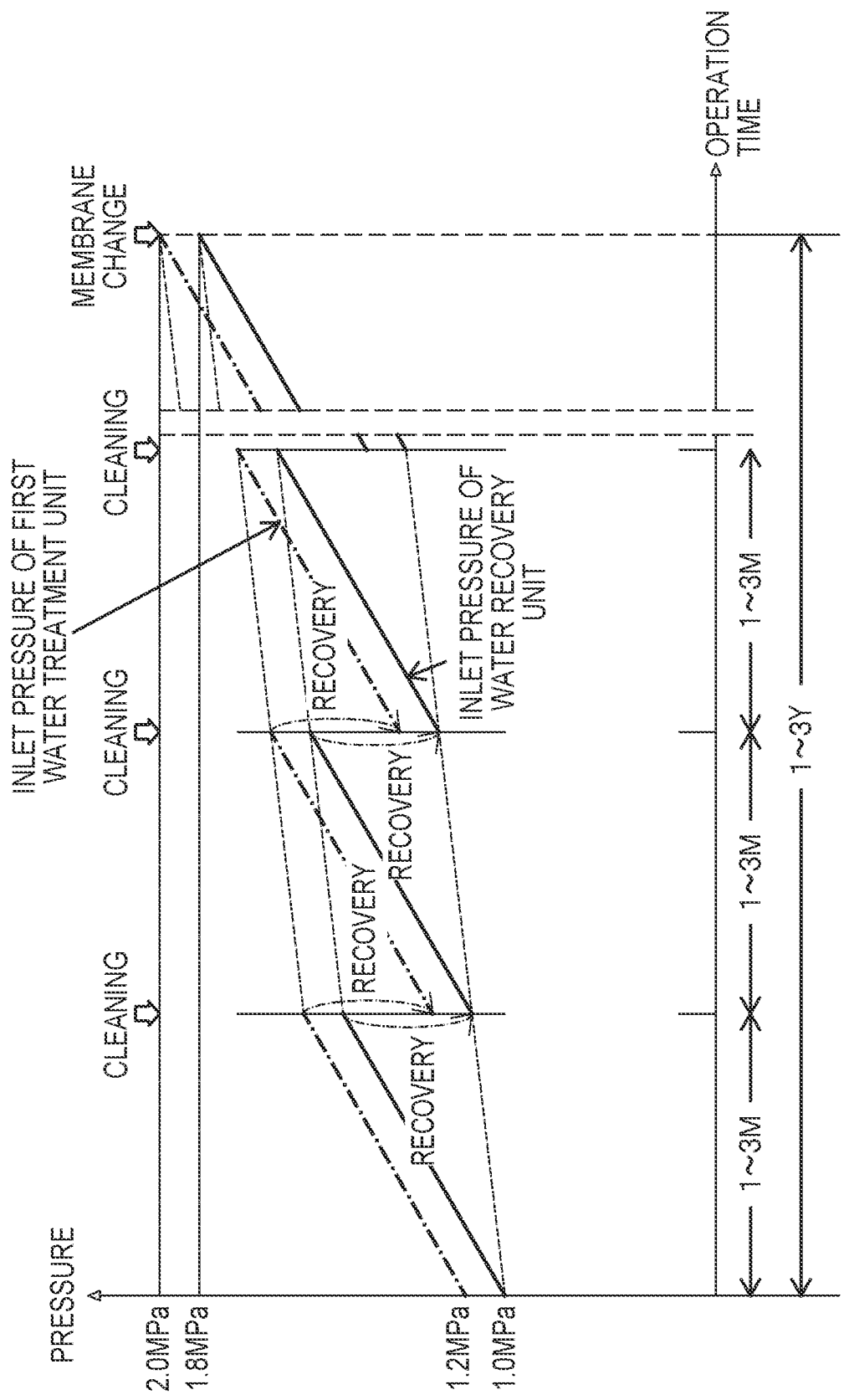
FIG. 9 is a graph showing pressures of the water treatment unit and the water recovery unit in the desalination apparatus of the first embodiment with elapse of the operation time.

FIG. 9 shows a change over time of the necessary supply pressure in the first water treatment unit 26 and the water recovery unit 28 in the desalination apparatus 24 of the first embodiment.

Table 1 shows various states at the start of the operation and at three years after the start of the operation in the first comparative example, the second comparative example, the first embodiment, and the second embodiment to be described later.

TABLE 1

|  |  | First comparative example | | Second comparative example | | First embodiment | | Second embodiment | |
| --- | --- | --- | --- | --- | --- | --- | --- | --- | --- |
|  |  | At start of operation | After 3 years have passed | At start of operation | After 3 years have passed | At start of operation | After 3 years have passed | At start of operation | After 3 years have passed |
| First water treatment unit | Necessary supply pressure | 1.0 MPa | 1.5 MPa | 1.0 MPa | 1.5 MPa | 1.2 MPa | 2.0 MPa | 1.0 MPa | 1.5 MPa |
|  | Permeated water pressure | No pressure | No pressure | No pressure | No pressure | 0.2 MPa | 0.0 MPa | No pressure | No pressure |
|  | Concentrated water pressure | No pressure | No pressure | 0.8 MPa | 1.3 MPa | 1.0 MPa | 1.8 MPa | 0.8 MPa | 1.3 MPa |
| Concentrated water tank | Capacity | 5 m³ | | None | | None | | None | |
| Concentrated water pump | Supply pressure | 1.8 MPa | | None | | None | | Direct supply + 0.5 MPa | |
| Water recovery unit | Necessary pressure | 1.0 MPa | Pressure has reached 1.8 MPa for 1.5 years Cleaning frequency has increased | 1.0 MPa (Insufficient pressure) | 1.8 MPa (Insufficient pressure) | 1.0 MPa | 1.8 MPa | 1.0 MPa | 1.8 MPa |
| Operation state | | Flow rate decreases after 1.5 years and module usage period is shorten | | Treatment amount shortage Poor water quality due to insufficient pressure | | Flow rate is stable for 3 years | | Flow rate is stable for 3 years | |

In the desalination apparatus 24 of the first embodiment, the output of the raw water pump 32 is set higher than that of the desalination apparatus 104 of the first comparative example. By adjusting the opening degree of the treatment water valve 40, the inlet operating pressure in the first water treatment unit 26 can be set to a desired pressure. Specifically, the supply pressure to the first water treatment unit 26 is set to be 1.2 MPa or more and 2.0 MPa or less. In the first water treatment unit 26, since there is predetermined pressure loss (for example, about 0.2 MPa) when the treated water flows in and flows out as the concentrated water, the supply pressure of the concentrated water supplied to the water recovery unit 28 is also lowered accordingly. However, a pressure range of 1.0 MPa or more and 1.8 MPa or less, which is the pressure range required for the separation of the concentrated water in the water recovery unit 28, is maintained.

As described above, in the desalination apparatus 24 of the first embodiment, the output of the raw water pump 32 is set higher than the output of the raw water pump 120 of the first comparative example and the second comparative example, thereby ensuring the supply pressure of the treated water (concentrated water) to the water recovery unit 28. By configuring the pressure increasing means with a simple configuration without newly adding a pump, it is possible to secure the pressure of the treated water required for the operation of the water recovery unit 28 and to achieve a reliable operation in the water recovery unit 28.

Moreover, in the water recovery unit 28, fouling progresses with the lapse of time, and the pressure loss increases; however, the pressure of the concentrated water, that is, the supply pressure to the water recovery unit 28 is increased by gradually increasing the output of the raw water pump 32. Thus, fouling in the water recovery unit 28 can be suppressed even after the operation time has elapsed, and a decrease in efficiency of separating the concentrated liquid into the recovered liquid and the waste liquid can be suppressed. In the liquid recovery unit 28, it is possible to reduce the influence of the increase in the pressure loss with the lapse of time and to achieve a stable operation of the liquid recovery unit 28.

In addition, the desalination apparatus 24 of the first embodiment includes the treatment water valve 40, and can adjust the pressure of the permeated water (treatment water) flowing through the treatment water pipe 38. As a result, it is possible to adjust the water pressure of the concentrated water flowing through the concentrated water pipe 36 and to supply the concentrated water to the water recovery unit 28 at a suitable water pressure. For example, when the supply pressure of the raw water to the first water treatment unit 26 is increased with the progress of fouling of the water recovery unit 28, the opening degree of the treatment water valve 40 is reduced, so that it is possible to secure the water pressure of the concentrated water and to suppress an excessive increase in pressure of the treated water.

By suitably setting the output of the raw water pump 32 and the opening degree of the treatment water valve 40, it is easy to adjust the recovery rate in the first water treatment unit 26 and the water recovery unit 28 to a desired value.

In addition, since the concentrated water tank 108 is not provided in the concentrated water pipe 36, the structure can be simplified, and the desalination apparatus 24 can be operated at low cost. Since the concentrated water tank 108 is not provided, the concentrated water continuously flows from the first water treatment unit 26 to the water recovery unit 28, so that it is not necessary to place the water recovery unit 28 under operation control different from that of the first water treatment unit 26.

Figure 6:
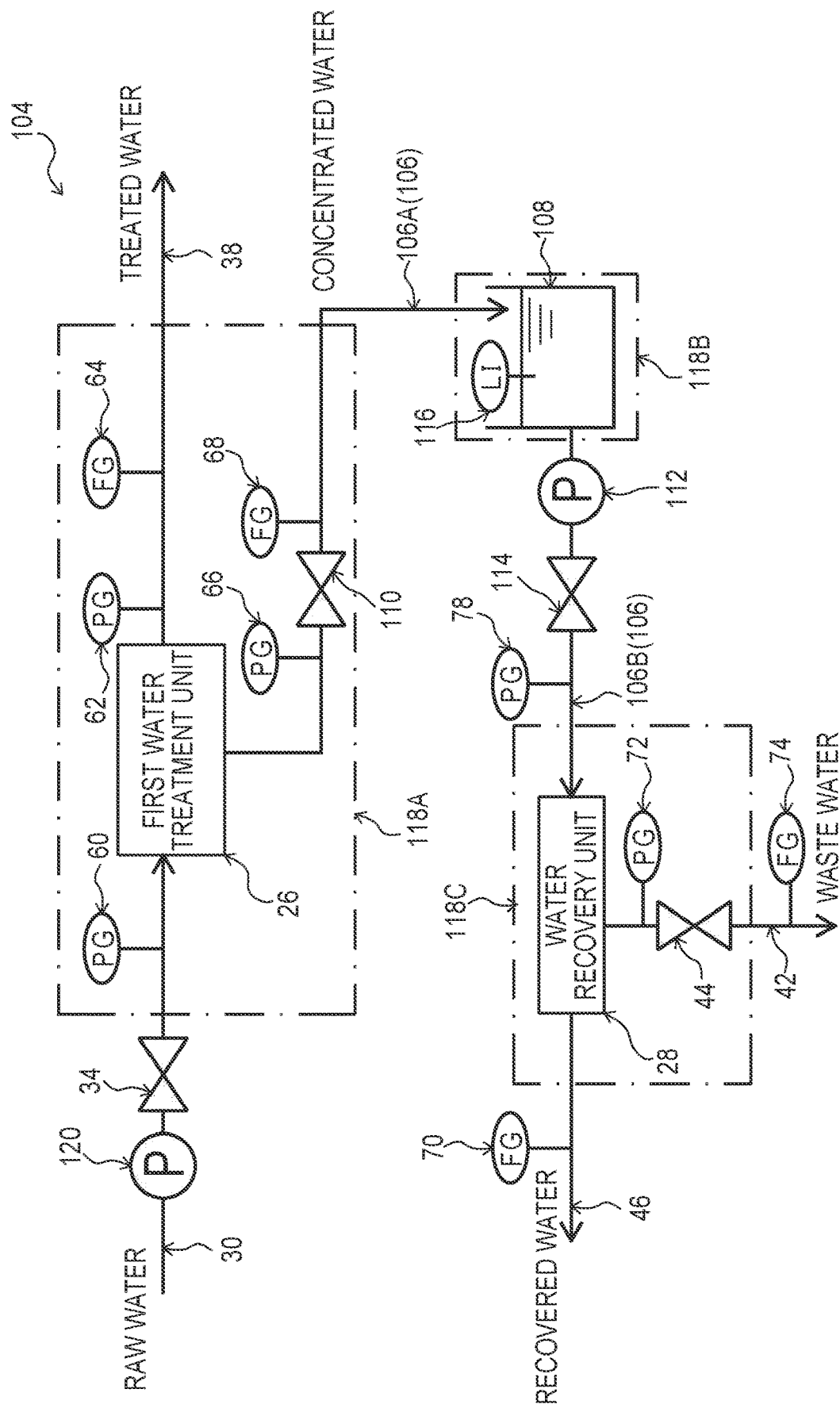
FIG. 6 is a configuration diagram showing the desalination apparatus of a first comparative example.

Since the desalination apparatus 104 of the first comparative example includes the three skits 118A, 118B, and 118C as shown in FIG. 6, the desalination apparatus is likely to be subject to restrictions on the installation location, and there is a possibility that the installation cost will increase. On the other hand, in the desalination apparatus 24 of the first embodiment, the concentrated water tank 108 is not provided, and the desalination apparatus can be configured as one skit 76; therefore, a degree of freedom of the installation place increases, and the installation cost can be reduced. In addition, as the number of pumps, only the single raw water pumps 32 is needed in the desalination apparatus 24 of the first embodiment, and therefore, the installation space is small as compared with the configuration using two pumps including the raw water pump 120 and the concentrated water pump 112 as in the desalination apparatus 104 of the first comparative example.

The raw water contains the scale component as described above. By adjusting the concentration of the scale component and an optimal flow rate of a treated liquid in the first water treatment unit 26, it is possible to achieve the recovery rate in the first water treatment unit 26 in a range of 75% or more and 90% or less. Considering only efficiency of water recovery, the recovery rate is preferably higher. However, when the recovery rate is set to be too high, scale is highly likely to occur, and therefore, the upper limit of the recovery rate is set to about 90%, preferably about 80% from the viewpoint of suppressing the scale.

Next, a modification of the first embodiment will be described. In the modification of the first embodiment, elements similar to those in the first embodiment are denoted by the same reference numerals, and detailed description thereof is omitted.

Figure 10:
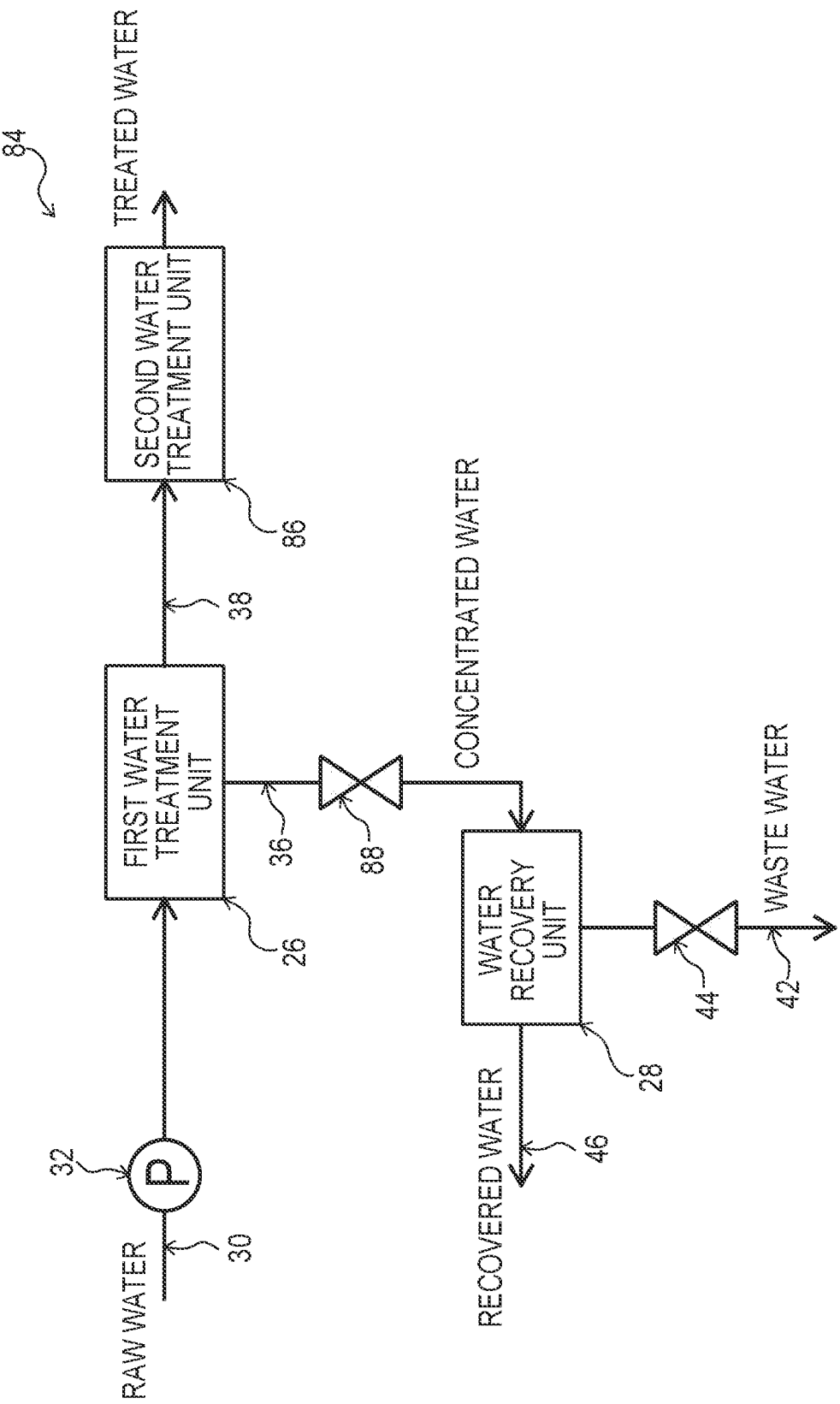
FIG. 10 is a configuration diagram showing the desalination apparatus which is the example of the liquid treatment apparatus of a modification of the first embodiment.

FIG. 10 shows a desalination apparatus 84 of the modification of the first embodiment. In the desalination apparatus 84 of the modification of the first embodiment, a second water treatment unit 86 is disposed instead of the treatment water valve 40 (see FIG. 2) in the desalination apparatus 24 of the first embodiment.

Similarly to the first water treatment unit 26, the second water treatment unit 86 includes one or a plurality of banks 50 (see FIG. 3) therein, and the bank 50 includes one or a plurality of vessels 52. Permeated water of the first water treatment unit 26 is supplied as treated water to the second water treatment unit 86. Then, the permeated water is separated into second permeated water that has permeated through the reverse osmosis membranes 56 provided in the plurality of modules 54 of the vessel 52 and concentrated water other than the second permeated water.

The concentrated water pipe 36 is provided with a concentrated water valve 88. By adjusting the opening degree of the concentrated water valve 88, the water pressure and the flow rate of the concentrated water flowing through the concentrated water pipe 36 can be adjusted. In the modification of the first embodiment, the pressure increasing means includes the raw water pump 32, the second water treatment unit 86, and the concentrated water valve 88.

Although a pressure gauge and a flow meter provided in each pipe are not illustrated in FIG. 10, for example, similarly to the desalination apparatus 24 of the first embodiment, the pressure gauge and the flow meter are provided at appropriate positions of each pipe.

Also in the desalination apparatus 84 of the modification of the first embodiment having the configuration as described above, the first water treatment unit 26 and the water recovery unit 28 are directly connected by the concentrated water pipe 36, and there is no site where the concentrated water is retained. Since the concentrated water is not retained, aggregation of an aggregated component in the concentrated water can be suppressed. Fouling in the water recovery unit 28 can be suppressed, and an increase in pressure loss of the water recovery unit 28 can also be suppressed. Thus, the increase in pressure necessary for the operation of the water recovery unit 28 can also be suppressed, and a large flow rate of the treated water (concentrated water) flowing through the water recovery unit 28 can be secured.

Moreover, the desalination apparatus 84 of the modification of the first embodiment includes the second water treatment unit 86. The second water treatment unit 86 is located on the downstream side of the first water treatment unit 26, and the treated water of the first water treatment unit 26 is further separated into second treatment water and the concentrated water by the second water treatment unit 86. Therefore, as the second treatment water obtained by the desalination apparatus 84 of the modification of the first embodiment, water having less impurities than the treated water obtained by the desalination apparatus 24 of the first embodiment is obtained.

In the desalination apparatus 84 of the modification of the first embodiment, the concentrated water valve 88 is provided in the concentrated water pipe 36. In the raw water pump 32 of the desalination apparatus 84, a higher pressure than the raw water pump 120 of the first comparative example and the second comparative example is applied to the treated water; however, the pressure and the flow rate of the concentrated water supplied from the first water treatment unit 26 to the water recovery unit 28 can be adjusted to suitable ranges by adjusting the opening degree of the concentrated water valve 88.

In the desalination apparatus 84 of the modification of the first embodiment, with a simple configuration in which the raw water pump 32, the second water treatment unit 86, and the concentrated water valve 88 are provided, it is possible to secure the pressure of the treated water required for the operation of the water recovery unit 28 and to achieve reliable operation in the water recovery unit 28.

Next, the second embodiment will be described. In the second embodiment, elements similar to those in the first embodiment are denoted by the same reference numerals, and detailed description thereof is omitted.

As shown in FIG. 11, in a desalination apparatus 204 of the second embodiment, the treatment water valve 40 (see FIG. 2) and the second water treatment unit 86 (see FIG. 10) are not provided in a treatment water pipe 38.

A concentrated water pipe 36 is provided with a concentrated water pump 206 and a concentrated water valve 208 in order from a first water treatment unit 26 side. The concentrated water pump 206 can increase the pressure of concentrated water flowing through the concentrated water pipe 36 and supply the concentrated water to the water treatment unit. The concentrated water valve 208 can adjust the pressure and the flow rate of the concentrated water increased in pressure by the concentrated water pump 206. In the second embodiment, the pressure increasing means includes the concentrated water pump 206 and the concentrated water valve 208.

Although a pressure gauge and a flow meter provided in each pipe are not illustrated in FIG. 11, for example, similarly to the desalination apparatus 24 of the first embodiment, the pressure gauge and the flow meter are provided at appropriate positions of each pipe.

Also in the desalination apparatus 204 of the second embodiment having the configuration as described above, the first water treatment unit 26 and the water recovery unit 28 are directly connected by the concentrated water pipe 36, and there is no site where the concentrated water is retained. Since the concentrated water is not retained, aggregation of an aggregated component in the concentrated water can be suppressed. Since it is possible to suppress fouling in the water recovery unit 28 can be suppressed and the increase in pressure loss of the water recovery unit 28, the increase in pressure necessary for the operation of the water recovery unit 28 can also be suppressed, and a large flow rate of the treated water (concentrated water) flowing through the water recovery unit 28 can be secured.

In the desalination apparatus 204 of the second embodiment, the concentrated water pump 206 is provided in the concentrated water pipe 36. Although a portion of the pressure of the raw water pump 32 is applied to the concentrated water, it is possible to increase the pressure of the concentrated water by the concentrated water pump 206 and supply the concentrated water to the water recovery unit 28 while using this pressure. That is, a shortage of the pressure of the raw water pump 32 can be suitably compensated using the concentrated water pump 206, and a state in which the compressed water has a predetermined pressure can be achieved. As a result, in the raw water pump 32, it is not necessary to increase the pressure of the concentrated water in consideration of the water treatment in the water recovery unit 28. That is, since pressurization to such an extent that water treatment can be performed in the first water treatment unit 26 is sufficient, the size of the raw water pump 32 can be reduced. Since the concentrated water is directly pressurized, the pressure can be efficiently increased to a desired pressure.

FIG. 12 shows the necessary supply pressure in the first water treatment unit 26 and the water recovery unit 28 in the desalination apparatus 84 of the second embodiment and concentrated water pressure discharged from the first water treatment unit 26.

In the desalination apparatus 204 of the second embodiment, the output of the raw water pump 32 is set such that an inlet supply pressure of the first water treatment unit 26 is 1.0 MPa or more and 1.8 MPa or less. Thus, the pressure of the concentrated water at an outlet of the first water treatment unit 26 decreases by the pressure loss of the first water treatment unit 26. In the example shown in FIG. 12, the concentrated water pressure at the outlet of the first water treatment unit 26 decreases to lower than the necessary supply pressure to the first water treatment unit 26. However, since the concentrated water is pressurized by the concentrated water pump 206 provided in the concentrated water pipe 36, the pressure of the concentrated water can be increased to the necessary supply pressure of the water recovery unit 28.

In the desalination apparatus 204 of the second embodiment, with a simple configuration in which the concentrated water pump 206 and the concentrated water valve 208 are provided, it is possible to secure the pressure of the treated water required for the operation of the water recovery unit 28 and to achieve reliable operation in the water recovery unit 28.

In the above description, an example is described in which the liquid treatment apparatus of the technology of the present disclosure is a desalination apparatus; however, the liquid treatment apparatus can be widely applied to an apparatus that removes impurities from raw water using the reverse osmosis membrane.

The treated liquid as a treatment target in the liquid treatment apparatus is not limited to the above-described fresh water such as city water, well water, and industrial water, and may be, for example, sea water. In addition, a solvent of the treated liquid is not limited to water.

The ultrapure water production system 12 described above is an example of a pure water production system in the technology of the present disclosure. Depending on the impurity concentration of the generated water, for example, the secondary pure water apparatus 20 may be omitted to configure the pure water production system.

The disclosure of Japanese Patent Application No. 2020-173516, filed on Oct. 14, 2020, is incorporated herein by reference in its entirety.

All publications, patent applications, and technical standards mentioned in this description are incorporated herein by reference to the same extent as if each individual publication, patent application, or technical standard was specifically and individually indicated to be incorporated by reference.

The invention claimed is:

1. A liquid treatment method of treating a treated liquid using a liquid treatment apparatus that is incorporated into a pure water production system, the liquid treatment apparatus comprising:
   a liquid treatment unit that includes:
   an inlet connected to an inlet line communicating with a source of freshwater,
   a first reverse osmosis membrane in which the freshwater, which is a treated liquid, is separated into a permeate that permeates the first reverse osmosis membrane and a concentrate other than the permeate,
   a first outlet connected to a permeate line,
   a second outlet connected to a concentrate line, and
   a liquid recovery unit that includes a second reverse osmosis membrane and in which the concentrate is separated into a recovered liquid that permeates the second reverse osmosis membrane and a waste liquid other than the recovered liquid;
   a raw water pump mounted in the inlet line;
   a permeate valve mounted in the permeate line for adjusting a flow rate of the permeate, sets a liquid pressure of the concentrate at an inlet portion of the liquid recovery unit to 1.0 MPa or more and 1.8 MPa or less, such that a state capable of separating into the recovered liquid and the waste liquid in the liquid recovery unit continues;
   wherein the concentrate is directly fed from the liquid treatment unit to the liquid recovery unit without retaining it, in order to maintain separation of the recovered liquid and waste liquid in the liquid recovery unit; and
   wherein the concentrate line is provided without a pump to feed directly the concentrate from the liquid treatment unit to the liquid recovery unit;
   wherein the liquid treatment method comprising:
   detecting an increase in a pressure loss of the liquid recovery unit using a treatment water pressure sensor provided on the concentrate line; and
   controlling the permeate valve for increasing the liquid pressure of the concentrate according to the increase in the pressure loss of the liquid recovery unit.

2. The liquid treatment method according to claim 1, wherein a liquid recovery rate obtained by dividing a flow rate of the permeate by a flow rate of the treated liquid is 75% or more and 90% or less in the liquid treatment unit.

* * * * *